(12) United States Patent
Digiuni

(10) Patent No.: US 9,113,744 B2
(45) Date of Patent: Aug. 25, 2015

(54) CAPSULE CONTAINING A DOSE OF SUBSTANCE FOR MAKING A DRINK, AND A METHOD FOR MAKING A DRINK USING THE CAPSULE

(75) Inventor: Paolo Digiuni, Montagnola (CH)

(73) Assignee: Caffitaly System S.p.A., Gaggio Montano (Bologna) (IT)

( * ) Notice: Subject to any disclaimer, the term of this patent is extended or adjusted under 35 U.S.C. 154(b) by 325 days.

(21) Appl. No.: 13/583,324

(22) PCT Filed: Mar. 7, 2011

(86) PCT No.: PCT/IB2011/050949
§ 371 (c)(1),
(2), (4) Date: Sep. 7, 2012

(87) PCT Pub. No.: WO2011/117768
PCT Pub. Date: Sep. 29, 2011

(65) Prior Publication Data
US 2013/0040021 A1   Feb. 14, 2013

(30) Foreign Application Priority Data
Mar. 26, 2010   (IT) .............................. VR2010A0062

(51) Int. Cl.
*B65D 85/804*   (2006.01)
*A47J 31/36*   (2006.01)

(52) U.S. Cl.
CPC .......... *A47J 31/3628* (2013.01); *B65D 85/8043* (2013.01)

(58) Field of Classification Search
CPC ......................... B65D 85/8043; A47J 31/3628
USPC ....................................................... 426/111
See application file for complete search history.

(56) References Cited

U.S. PATENT DOCUMENTS

| 3,533,807 | A | | 10/1970 | Wakefield |
| 4,867,993 | A | * | 9/1989 | Nordskog ........................ 426/77 |

(Continued)

FOREIGN PATENT DOCUMENTS

| RU | 2312803 C2 | 12/2007 |
| WO | WO2010021181 A1 | 2/2010 |

OTHER PUBLICATIONS

Search Report from Italian Patent Office for VR2010A000062.

*Primary Examiner* — Rena L Dye
*Assistant Examiner* — Chaim Smith
(74) *Attorney, Agent, or Firm* — Maginot, Moore & Beck, LLP

(57) ABSTRACT

A capsule for making a drink comprises a cup-shaped main body (6) forming a housing chamber (7) containing a powdered or liquid substance (2). The main body (6) comprises a bottom wall (8) and a lateral wall (9) which has a lower portion (10) connected to the bottom wall (8) and an upper portion (11) delimiting an opening which is closed by a cover element (17). The capsule also comprises lengthening means (18) which, following an increase in the capsule (1) internal pressure, allow a movement away from the cover element (17) by the lower portion (10) of the lateral wall (9) and the bottom wall (8) connected to it. Also claimed is a method which comprises feeding water and/or steam into the capsule (1) to increase the capsule (1) internal pressure and so cause the movement of the lower portion (10) of the lateral wall (9) and the bottom wall (8) away from the cover element (17) until the bottom wall (8) is torn against external piercing means, thus allowing the drink to be supplied through the bottom wall (8).

9 Claims, 4 Drawing Sheets

(56) References Cited

U.S. PATENT DOCUMENTS

| | | |
|---|---|---|
| 5,242,702 A | 9/1993 | Fond |
| 2002/0035928 A1* | 3/2002 | Kataoka ................... 99/279 |
| 2006/0174769 A1 | 8/2006 | Favre et al. |
| 2011/0151060 A1* | 6/2011 | Nakagiri ................... 426/77 |

* cited by examiner

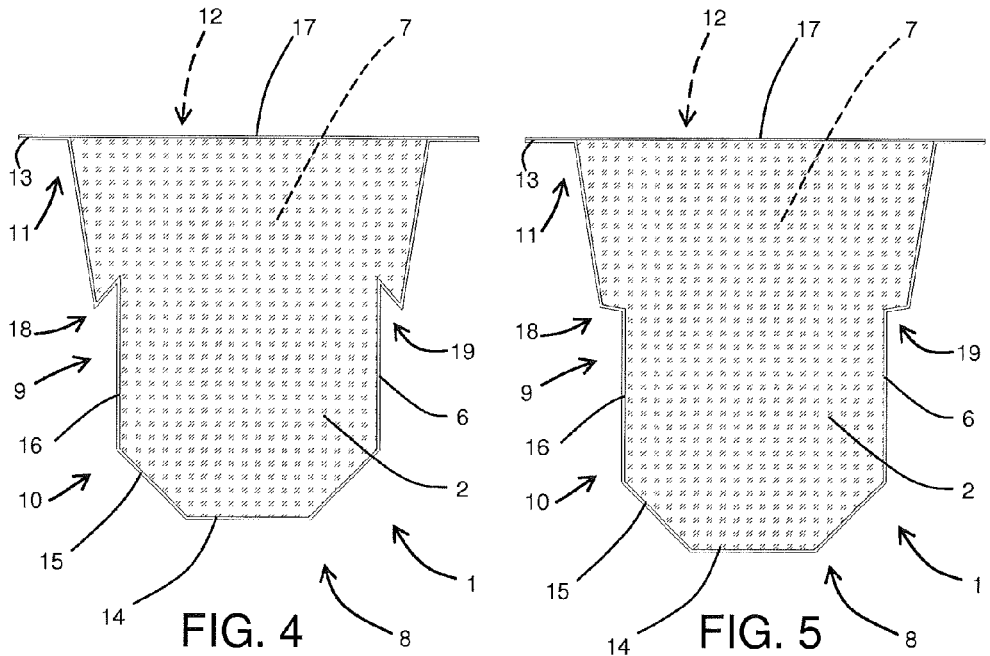
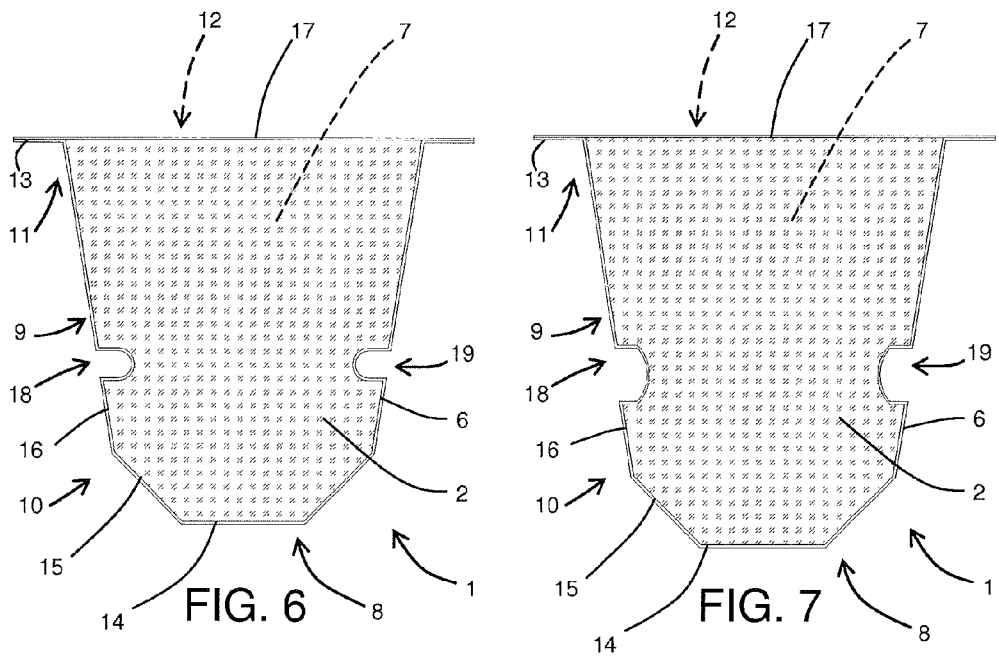

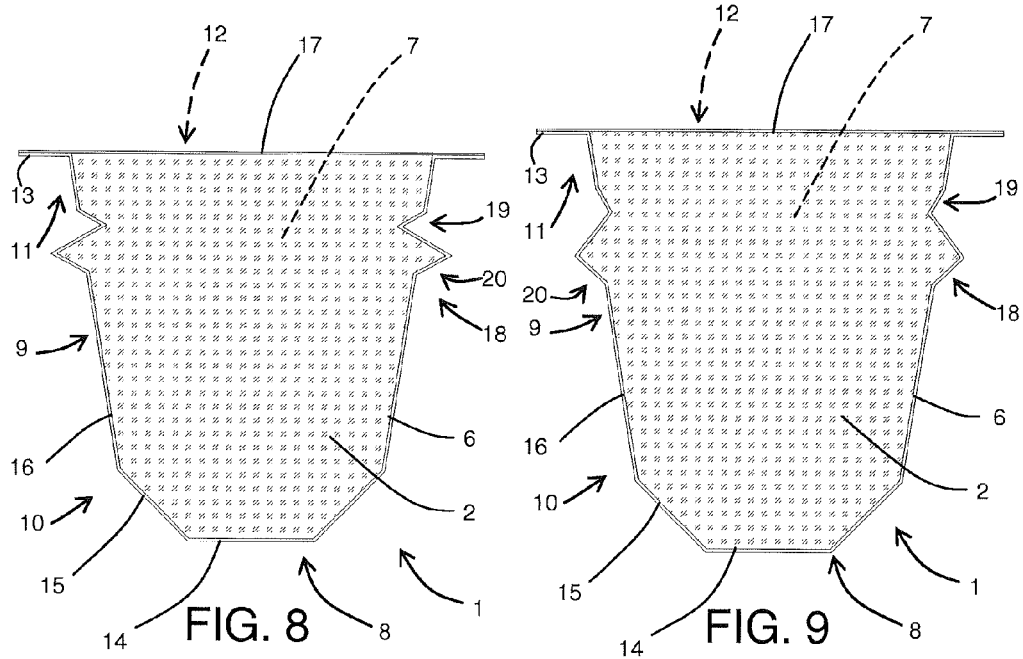
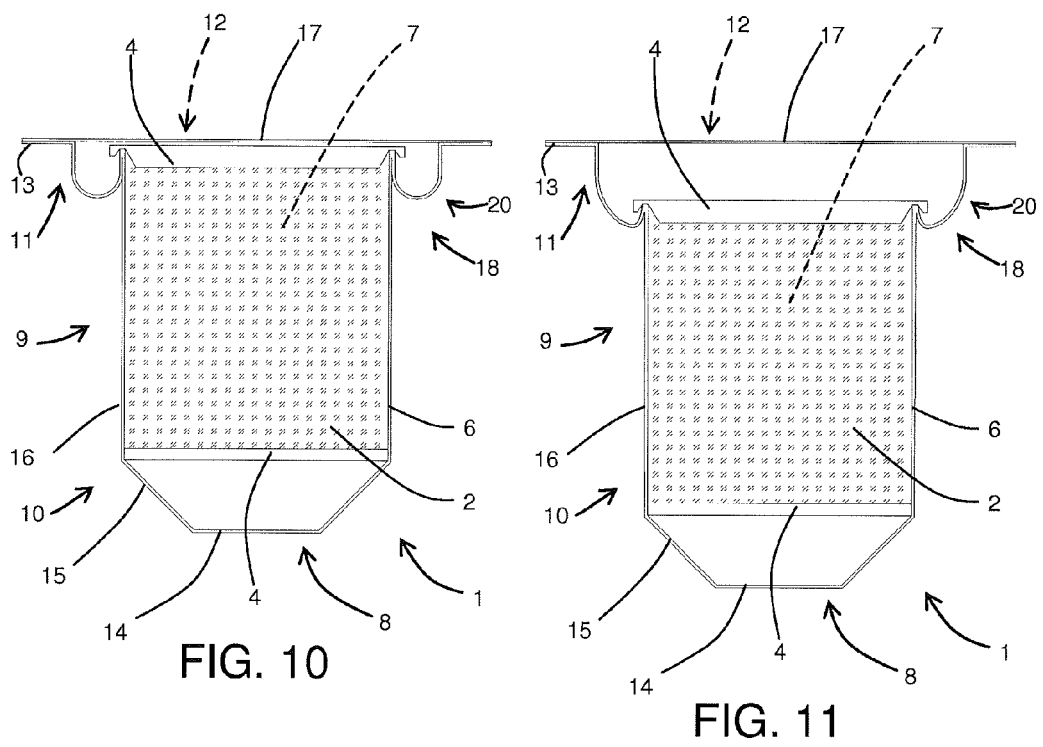

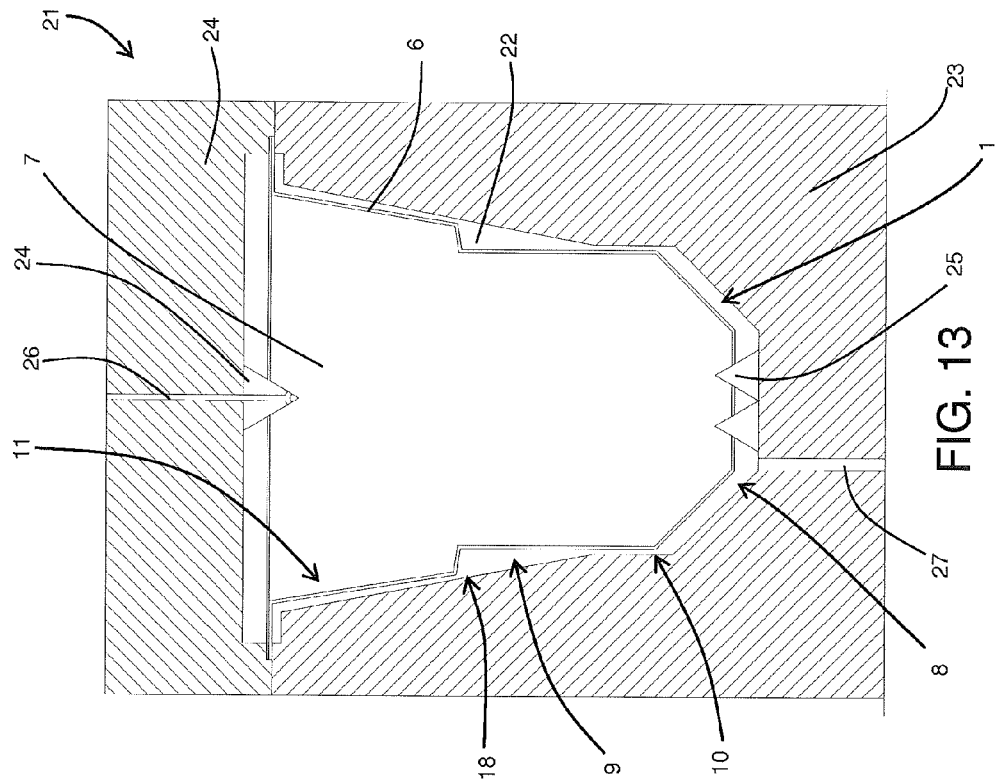
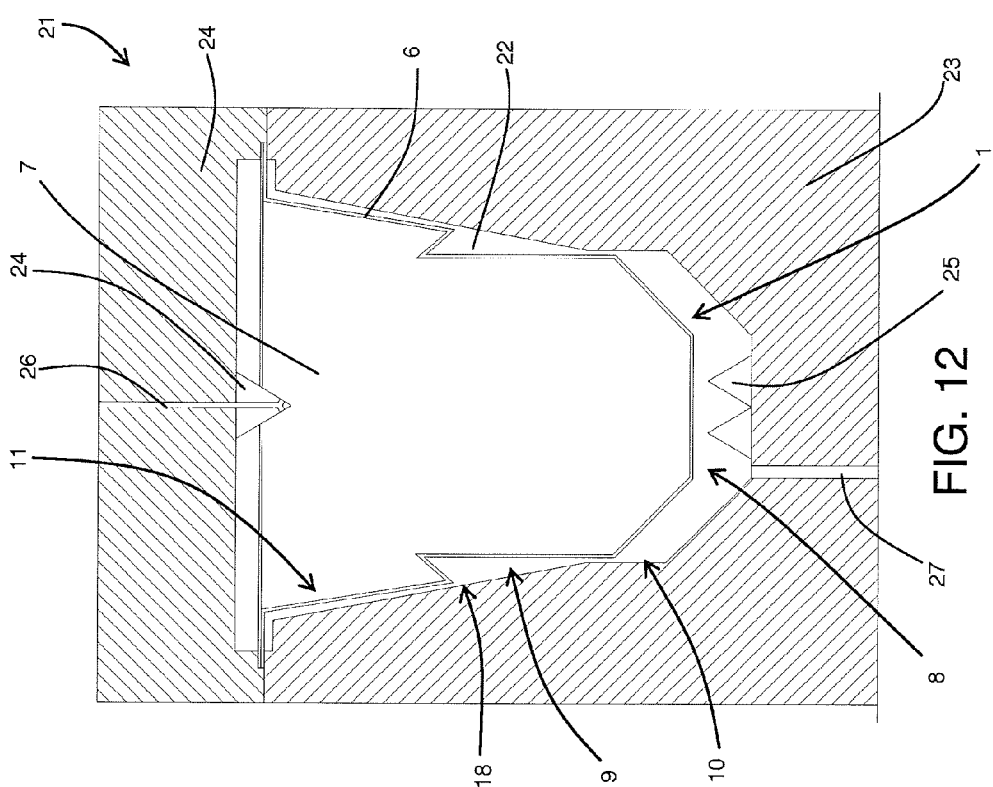

CAPSULE CONTAINING A DOSE OF SUBSTANCE FOR MAKING A DRINK, AND A METHOD FOR MAKING A DRINK USING THE CAPSULE

BACKGROUND

This invention relates to a capsule containing a dose of a substance for making a drink, as well as to a method for making a drink using the capsule.

Depending on requirements, the substance may be powdered or liquid.

In particular, this invention is for making coffee or other drinks containing coffee (such as cappuccino) using capsules 1 (capsules of this type normally contain a powdered substance). Therefore, reference is preferably made to that type of drink hereinafter. In any case, this invention may be used without distinction for making any other drink using capsules 1.

Moreover, if the substance contained in the capsule is powdered, this invention may be used without distinction for making drinks by means of a method for infusion of the powder using pressurised hot water and/or steam, as well as making drinks when the powdered substance is dissolved by water and/or steam.

At present, there are many types of prior art capsules 1 and apparatuses for making drinks and in particular coffee.

According to a first prior art type, the capsule is relatively rigid and at the moment of making the drink it must be pierced in advance at two points to allow on one side water and/or steam to be fed into it, and on the other the drink to come out.

The main disadvantage of this solution is the fact that it is impossible to make the drink at a relatively high pressure like that required, for example, when making espresso coffee.

In a second prior art type, described for example in patents EP 468 078 and EP 507 905, in contrast the capsule is initially pierced only at its face through which the water and/or pressurised steam are supplied into the capsule. Only at a later stage, when the internal pressure reaches a predetermined level, the bottom of the capsule deforms, tearing against external fixed contact elements which are located a predetermined distance from the bottom of the capsule. At the same time, the rest of the capsule remains unchanged. More particularly, in the case of patent EP 507 905 when the bottom deforms it passes from a concave shape (if seen from the outside) to a flat or even convex shape. In contrast, in the case of patent EP 468 078 the bottom initially has a substantially flat shape and following the pressure increase it adopts a convex shape.

According to a third prior art type, described for example in U.S. Pat. No. 4,136,202, the capsule has a weakened face able to burst when the internal pressure increases. Therefore, in this case operation is similar to that just described, except for the fact that the capsule bursts rather than tearing against one or more fixed spikes.

However, both the second and the third prior art types are not without disadvantages, since capsules 1 for making coffee usually contain a filter able to retain the coffee powder while allowing the drink to come out. The filter is normally positioned close to the wall of the capsule through which the drink comes out. Consequently, all of the methods for using the capsule which involve deformation of that wall may cause movement of and/or accidental damage to the filter which could compromise correct retention of the coffee powder.

A further problem that is significant in commercial terms is the fact that it is impossible to have a single type of capsule which can be used without distinction in machines designed according to different operating logics. In particular, the need is felt to be able to use the same type of capsule both in machines in which delayed opening is achieved by bursting of a wall of the capsule, and machines in which in contrast it is achieved following tearing of the wall against one or more fixed piercing spikes. But that is substantially impossible with the prior art capsules 1.

In this context, the technical purpose which forms the basis of the invention is to provide a capsule containing a dose of a substance for making a drink which overcomes the above-mentioned disadvantages.

In particular, the technical purpose of this invention is to provide a capsule containing a dose of a substance for making a drink which is not subject to the risks of accidental movement of the filter following deformation of its wall through which the drink comes out.

The technical purpose of this invention is also to provide a capsule containing a dose of a substance for making a drink which can be used in machines of various types.

The technical purpose specified and the aims indicated are substantially achieved by a capsule containing a dose of a substance for making a drink as described in the appended claims.

DESCRIPTION OF THE FIGURES

Further features and the advantages of this invention are more apparent in the detailed description of several preferred, non-limiting embodiments of a capsule containing a dose of a substance for making a drink, and the method for making a drink using the capsule, illustrated in the accompanying drawings, in which:

FIG. 4 is a schematic vertical cross-section of a first embodiment of a capsule according to this invention, in a home condition;

FIG. 5 is a schematic illustration of the capsule of FIG. 4 in the extraction condition;

FIG. 6 is a schematic vertical cross-section of a second embodiment of a capsule according to this invention, in a home condition;

FIG. 7 is a schematic illustration of the capsule of FIG. 6 in the extraction condition;

FIG. 8 is a schematic vertical cross-section of a third embodiment of a capsule according to this invention, in a home condition;

FIG. 9 is a schematic illustration of the capsule of FIG. 8 in the extraction condition;

FIG. 10 is a schematic vertical cross-section of a fourth embodiment of a capsule according to this invention, in a home condition;

FIG. 11 is a schematic illustration of the capsule of FIG. 10 in the extraction condition;

FIG. 12 is a cross-section of a system for making a drink according to this invention, using a capsule made according to the first embodiment, in a condition which precedes preparation of the drink; and FIG. 13 shows the system of FIG. 12 in a condition in which the drink is supplied.

DETAILED DESCRIPTION

With reference to the accompanying drawings, the numeral 1 denotes in its entirety a capsule containing a dose of a substance 2 (powered or liquid) for making a drink, made according to this invention.

Figure 1:
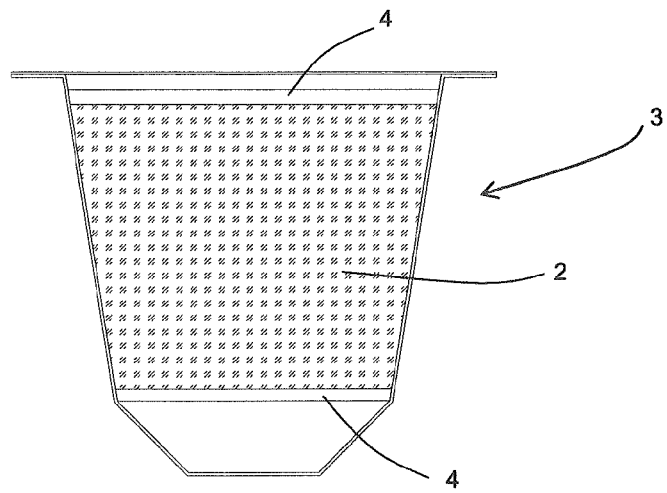
FIGS. 1 to 3 are schematic vertical cross-sections of three possible prior art types of capsules 1.
Figure 2:
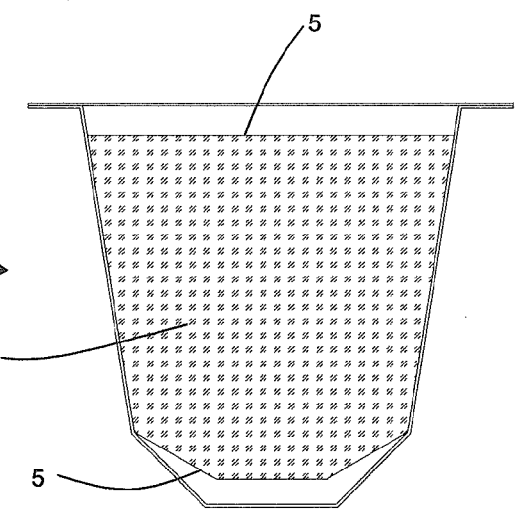
Figure 3:
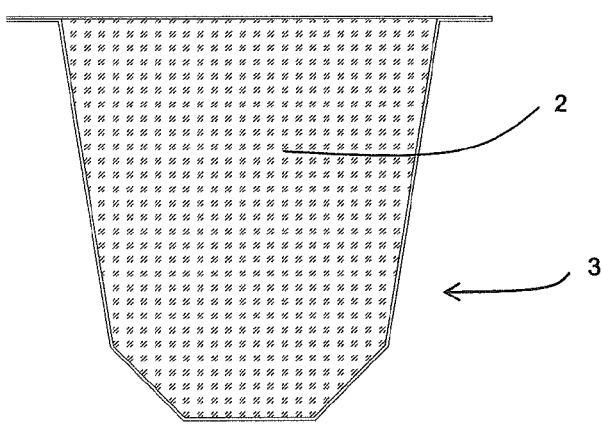

FIGS. 1 to 3 show generic capsules 1 of the prior art type 3 and are only intended to illustrate three possible different internal structures of the capsule which can without distinction even be applied to a capsule 1 made according to this invention.

Depending on requirements, the capsule may house only the substance 2 (usually for situations in which the substance 2 is liquid or dissolves to form the drink—FIG. 3), or one or more rigid filters 4 (FIG. 1) and/or one or more flexible membrane filters 5 (FIG. 2).

It should be noticed that although FIGS. 3 to 9 show capsules 1 without internal filters, they may be made with one or more internal filters of any type (as in the case in FIGS. 10 and 11 where the capsule 1 is fitted with rigid filters 4). In contrast, for clarity, in FIGS. 12 and 13 the capsule 1 is also shown without the substance 2.

In the known way, the capsule 1 according to this invention comprises first a cup-shaped main body 6 forming a housing chamber 7 containing a dose of the substance 2 to be used for making the drink. Advantageously, the main body 6 is made of a semi-rigid material such as plastic or aluminium.

In turn, the main body 6 comprises a bottom wall 8 forming the bottom of the cup and a lateral wall 9 extending from its own lower portion 10 connected to the bottom wall 8 to its own upper portion 11 delimiting an opening 12 for access to the housing chamber 7.

In more detail, in the embodiments illustrated, four different portions of the main body 6 can be identified. In particular, at the top (with reference to the orientation of the capsule 1 in the Figures) a first portion 13 is a flat ring (horizontal in the accompanying drawings) extending radially relative to a central axis of the capsule 1. At the bottom, a second portion 14 extends substantially flat, parallel with the first portion 13. Connected to the second portion 14 there is a third portion 15 which, if the capsule 1 has cylindrical symmetry, has the shape of a truncated cone.

The fourth portion 16, having the greatest extension, and which is described in more detail below, is interposed between the first portion 13 and the third portion 15.

It should be noticed that for the purposes of this invention, the above-mentioned third portion 15 may without distinction be considered as a part of the lower portion 10 of the lateral wall 9 or a part of the bottom wall 8. In contrast, the first portion 13 may be considered a part of the upper portion 11 of the lateral wall 9. It is the first portion 13 that delimits the access opening 12.

However, in other embodiments, both the lateral wall 9 and the bottom wall 8 may adopt any other shape without thereby departing from the scope of this invention.

The capsule 1 comprises a cover element 17 fixed to the upper portion 11 of the lateral wall 9 (and in particular to the first portion 13 in the accompanying drawings) which is designed to hermetically seal the access opening 12 so as to preserve the organoleptic properties of the substance 2.

Advantageously, the cover element 17 is a sheet of flexible material such as a plastic or aluminium material. It may or may not have weakened points (of the known type and therefore not illustrated).

According to this invention, the capsule 1 comprises lengthening means 18 which, following an increase in the capsule 1 internal pressure, allow a movement away from the cover element 17 by the lower portion 10 of the lateral wall 9 and the bottom wall 8 connected to it.

FIGS. 3 to 11 show four different embodiments in which the lengthening means 18 are always an integral part of the fourth portion 16 of the main body 6 described above. In other embodiments that may not be the case.

Advantageously, the lengthening means 18 are made in such a way as to allow the above-mentioned movement only following an increase in the capsule 1 internal pressure at least to a predetermined value. In the preferred embodiment for making espresso coffee, in particular, the lengthening means 18 allow the movement of the lower portion 10 of the lateral wall 9 and the bottom wall 8 connected to it when the capsule 1 internal pressure exceeds a predetermined value which may be between 1 and 15 bar.

In the preferred embodiments, the lengthening means 18 are a shaped portion of the lateral wall 9 itself. In particular, this shaped portion is advantageously made in such a way that it can be elastically and/or plastically deformed, following the increase in the internal pressure, from an undeformed starting condition to a deformed condition in which the lower portion 10 and the bottom wall 8 are further from the cover element 17 than when the shaped portion is in the starting condition.

Advantageously, that effect may be achieved by making the shaped portion in such a way that it forms at least one concavity 19 and/or one convexity 20 relative to the rest of the lateral wall 9.

FIGS. 4, 6, 8, 10 show four possible different embodiments of the capsule 1 (whose main body 6 has cylindrical symmetry) in which the lengthening means 18 are obtained by means of concave/convex shaped portions having various shapes. In particular, seen in cross-section, the shaped portions may have an arched profile (roughly semi-circular or semi-elliptical), a jagged profile, etc.

In general, to guarantee more uniform lengthening of the capsule 1 advantageously the lengthening means 18 extend perimetrically on the entire lateral wall 9 of the main body 6.

FIGS. 12 and 13 show a first system for making a drink, made according to this invention, which makes use of the possibility of lengthening the capsule 1.

The system consists of a capsule 1 of the type described above and an apparatus which, in turn, comprises an extraction unit 21 which can be opened, the inside of the unit forming an extraction chamber 22 in which the capsule 1 can be inserted. The accompanying drawings show only the extraction unit 21 and what it contains.

In the embodiment schematically illustrated, the unit 21, which may without distinction have a horizontal, vertical or angled axis, comprises a fixed part 23 chiefly forming the extraction chamber 22 and a mobile part 24 which can be opened (in the known way) and acts as a lid.

When the capsule 1 is inserted in the unit 21, the first annular portion 13 of the capsule is advantageously locked between the fixed part 23 and the mobile part 24, whilst the lower portion 10 of the lateral wall 9 and the bottom wall 8 are far enough from the unit 21 to be able to allow lengthening of the capsule 1.

Associated with the extraction unit 21 there are first piercing means 24 and second piercing means 25.

The first piercing means 24 are mounted in the extraction chamber 22 in such a way as to pierce the cover element 17 of the capsule 1 inserted in the extraction chamber 22 when the unit 21 is closed. In the accompanying drawings they are fixed to the mobile part 24.

The second piercing means 25 are mounted in the extraction chamber 22 for piercing the bottom wall 8 of the capsule 1 inserted in the extraction chamber 22 and allowing the drink to be supplied. However, in particular the second piercing means 25 are positioned in such a way that when the capsule 1 is inserted in the extraction chamber 22 the bottom wall 8 is not penetrated enough to allow the drink to be supplied. In the embodiment illustrated that is achieved by ensuring that in the capsule 1 starting condition there is a predetermined distance between the bottom wall 8 and the second piercing means 25. However, in other embodiments it may be the case that with the capsule 1 in the home position the second piercing means 25 are in contact with the bottom wall 8 or even that they partly bite into it.

At the same time, the second piercing means 25 are positioned in such a way that they completely penetrate the bottom wall 8, and therefore allow the drink to be supplied, when the capsule 1 is in its deformed condition.

For this purpose there are means 26 for feeding hot water and/or steam into the capsule 1 which are operatively associated with the first piercing means 24 (in the accompanying drawings they are schematically illustrated with a channel passing through the mobile part 24 and the first piercing means 24).

In practice, the hot water and/or steam supplied by the feed means 26 into the capsule 1 cause an increase in the internal pressure and consequent movement of the bottom wall 8 away from the cover element 17 until the bottom wall is torn against the second piercing means 25. At that point the drink can come out of the capsule 1 and, subsequently, out of the unit 21 through a discharge hole 27.

Finally, this invention also refers to the method for making a drink using a capsule 1 of the type described above, comprising the operating steps of piercing the cover element 17, feeding water and/or steam into the capsule 1 through the cover element 17 previously pierced, in such a way as to increase the capsule 1 internal pressure to at least a predetermined value sufficient to cause the movement of the lower portion 10 of the lateral wall 9 and the bottom wall 8 away from the cover element 17, and therefore to cause the consequent tearing of the bottom wall 8 against external piercing means, allowing the drink to be supplied through the bottom wall 8.

However, as already indicated, the capsule 1 according to this invention may also be used with a method for making the drink similar to traditional methods which comprises piercing the bottom wall 8 (particularly advantageous if the bottom wall 8 is relatively rigid and flat, as in the embodiments illustrated) then feeding hot water and/or steam into the chamber through the bottom wall 8 to increase the capsule 1 internal pressure until the cover element 17 bursts (this is facilitated if the cover element 17 is provided with weakened points).

This latter use is facilitated if the cover element 17 is made of a material with less resistance to breaking than that used to make the main body 6.

This invention brings important advantages.

Thanks to this invention, on one hand it was possible to provide a capsule which allows delayed opening of the bottom to be achieved without the bottom having to be subjected to deformations which could compromise the stability of the internal filter.

The capsules made according to this invention may also be used both in apparatuses in which the hot water and/or steam is fed through the cover element, with delayed supply of the drink through the bottom wall, and in apparatuses in which the hot water and/or steam is fed through the bottom wall, with delayed supply of the drink through the cover element.

Finally, it should be noticed that this invention is relatively easy to produce and that even the cost linked to implementing the invention is not very high. Advantageously, the main body of the capsule may be obtained by moulding or thermoforming.

The invention described above may be modified and adapted in several ways without thereby departing from the scope of the inventive concept.

Moreover, all details of the invention may be substituted with other technically equivalent elements and the materials used, as well as the shapes and dimensions of the various components, may vary according to requirements.

The invention claimed is:

1. A capsule containing a dose of a substance for making a drink, for use with a apparatus provided with means for feeding pressurized water and/or steam into a housing chamber of the capsule, the capsule comprising:
   a cup-shaped main body forming the housing chamber containing the substance, the main body including a bottom wall forming the bottom of the cup, the bottom wall configured to prevent liquid flow therethrough until the bottom wall is torn or penetrated, and a lateral wall connected at a lower portion thereof to the bottom wall and including an upper portion delimiting an opening for access to the housing chamber, the main body allowing beverage flow through it only after the bottom wall has been torn or penetrated by piercing means;
   a cover element fixed to the upper portion of the lateral wall for closing the access opening;
   characterised in that the lateral wall of the capsule includes lengthening means positioned between the cover element and the lower portion of the lateral wall and which, following an increase in the capsule internal pressure, allows a movement of the lower portion of the lateral wall and the bottom wall away from the cover element due to the increase in capsule internal pressure.

2. The capsule according to claim 1, characterised in that the lengthening means allow said movement following an increase in the capsule internal pressure at least to a predetermined value.

3. The capsule according to claim 1, characterised in that the lengthening means are constituted by a shaped portion of the lateral wall.

4. The capsule according to claim 3, characterised in that following the increase in the internal pressure, the shaped portion can be elastically and/or plastically deformed from a starting condition to a deformed condition in which the lower portion and the bottom wall are further from the cover element than when the shaped portion is in the starting condition.

5. The capsule according to claim 4, characterised in that the shaped portion forms at least one concavity and/or one convexity relative to the rest of the lateral wall.

6. The capsule according to claim 1, characterised in that the lengthening means extend perimetrically on the lateral wall of the containment body.

7. The capsule according to claim 1, characterised in that the lengthening means allow the movement of the lower portion of the lateral wall and of the bottom wall connected to it when the capsule internal pressure exceeds a limit value of between 1 bar and 15 bar.

8. A apparatus for making a drink, comprising:
   a capsule containing a dose of a substance for making a drink, and including;
   a cup-shaped main body forming the housing chamber containing the substance, the main body including a bottom wall forming the bottom of the cup, the bottom wall configured to prevent liquid flow therethrough until the bottom wall is torn or penetrated, and a lateral wall connected at a lower portion thereof to the bottom wall and including an upper portion delimiting an opening for access to the housing chamber, the main body allowing beverage flow through it only after the bottom wall has been torn or penetrated by a piercing means;
   a cover element fixed to the upper portion of the lateral wall for closing the access opening; and at the lateral wall, lengthening means positioned between the cover element and the lower portion of the lateral wall and which, following an increase in the capsule internal pressure, allow a movement away from the cover element by the lower portion of the lateral wall and the bottom wall connected to it; and an apparatus including;

an extraction unit which can be opened, the inside of this unit forming an extraction chamber in which the capsule can be inserted;

first piercing means mounted in the extraction chamber in such a way that they pierce the cover element of a capsule inserted in the extraction chamber when the unit is closed;

means for feeding water and/or steam into the capsule, the feed means being operatively associated with the first piercing means;

second piercing means mounted in the extraction chamber for piercing the bottom wall of the capsule inserted in the extraction chamber and allowing the drink to be supplied;

the second piercing means being positioned so that when the capsule is inserted in the extraction chamber and the lower portion of the lateral wall and the bottom wall are not moved away from the cover element, the bottom wall is not penetrated enough to allow the drink to be supplied, and so that they completely penetrate the bottom wall and allow the drink to be supplied when the lower portion of the lateral wall and the bottom wall are moved away from the cover element.

9. A method for making a drink using a capsule containing a dose of a substance for making a drink, in which the capsule includes;

a cup-shaped main body forming the housing chamber containing the substance, the main body including a bottom wall forming the bottom of the cup, the bottom wall configured to prevent liquid flow therethrough until the bottom wall is torn or penetrated, and a lateral wall connected at a lower portion thereof to the bottom wall and including an upper portion delimiting an opening for access to the housing chamber, the main body allowing beverage flow through it only after the bottom wall has been torn or penetrated by piercing means;

a cover element fixed to the upper portion of the lateral wall for closing the access opening; and at the lateral wall, lengthening means positioned between the cover element and the lower portion of the lateral wall and which, following an increase in the capsule internal pressure, allow a movement away from the cover element by the lower portion of the lateral wall and the bottom wall connected to it;

the method comprising the operating steps of:

piercing the cover element;

feeding water and/or steam under pressure through the cover element into the capsule;

increasing the internal pressure in the capsule to at least a predetermined value so as to cause the lower portion of the lateral wall to be moved away from the cover element; and thereby moving the bottom wall against external piercing means causing the consequent tearing of the bottom wall against the external piercing means, allowing the drink to be supplied through the bottom wall.

\* \* \* \* \*